(12) United States Patent
Zhang

(10) Patent No.: US 11,181,022 B2
(45) Date of Patent: Nov. 23, 2021

(54) METHOD AND DEVICE FOR MONITORING A NITROGEN OXIDE TRAP

(71) Applicant: Continental Automotive GmbH, Hannover (DE)

(72) Inventor: Hong Zhang, Tegernheim (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 202 days.

(21) Appl. No.: 16/305,178

(22) PCT Filed: May 4, 2017

(86) PCT No.: PCT/EP2017/060681
§ 371 (c)(1),
(2) Date: Nov. 28, 2018

(87) PCT Pub. No.: WO2017/207209
PCT Pub. Date: Dec. 7, 2017

(65) Prior Publication Data
US 2020/0318513 A1   Oct. 8, 2020

(30) Foreign Application Priority Data
May 31, 2016   (DE) .............. 10 2016 209 358.4

(51) Int. Cl.
*F01N 3/00*   (2006.01)
*F01N 3/08*   (2006.01)
*F02D 41/02*   (2006.01)

(52) U.S. Cl.
CPC ......... *F01N 3/0842* (2013.01); *F01N 3/0814* (2013.01); *F01N 2560/025* (2013.01);
(Continued)

(58) Field of Classification Search
CPC ............... F01N 3/0842; F01N 3/0814; F01N 2560/025; F01N 2560/026
(Continued)

(56) References Cited

U.S. PATENT DOCUMENTS 7,267,991 B2 * 9/2007 Ceccarini ........... B01D 53/9495
436/119
8,109,080 B2   2/2012 Gabe et al. ............... 60/286
(Continued)

FOREIGN PATENT DOCUMENTS

CN    101680337 A    3/2010 .......... B01D 53/94
DE    101 14 456 A1   10/2001 .......... F01N 11/00
(Continued)

OTHER PUBLICATIONS

Chinese Office Action, Application No. 201780034044.8, 13 pages, dated Apr. 24, 2020.
(Continued)

*Primary Examiner* — Jason D Shanske
(74) *Attorney, Agent, or Firm* — Slayden Grubert Beard PLLC

(57) ABSTRACT

Various embodiments may include a method for monitoring a nitrogen oxide trap comprising: monitoring a storage capacity of the nitrogen oxide trap; deactivating nitrogen oxide trap regeneration based on the monitored storage capacity; and upon a predetermined event, reactivating nitrogen oxide trap regeneration.

12 Claims, 1 Drawing Sheet

(52) U.S. Cl.
   CPC  *F01N 2560/026* (2013.01); *F01N 2900/1614* (2013.01); *F02D 41/0275* (2013.01); *F02D 2200/0808* (2013.01)

(58) Field of Classification Search
   USPC .......................................................... 60/274
   See application file for complete search history.

(56) References Cited

U.S. PATENT DOCUMENTS

| | | | |
|---|---|---|---|
| 9,856,773 B1* | 1/2018 | Park .................. | B01J 38/02 |
| 2006/0010857 A1* | 1/2006 | Hu ..................... | F01N 3/035 |
| | | | 60/286 |
| 2006/0153761 A1* | 7/2006 | Bandl-Konrad ...... | F01N 3/0842 |
| | | | 423/239.1 |
| 2007/0056268 A1* | 3/2007 | McCarthy, Jr. ..... | F01N 13/0097 |
| | | | 60/286 |
| 2007/0125072 A1* | 6/2007 | McCarthy, Jr. ....... | F01N 3/0885 |
| | | | 60/286 |
| 2008/0314030 A1 | 12/2008 | Mueller et al. ................ | 60/286 |
| 2009/0107113 A1 | 4/2009 | Thanasiu et al. .............. | 60/276 |
| 2012/0214663 A1* | 8/2012 | Chigapov .............. | B01J 29/076 |
| | | | 502/73 |
| 2013/0261930 A1* | 10/2013 | Kurtz ..................... | F01N 3/208 |
| | | | 701/102 |
| 2015/0113961 A1* | 4/2015 | de Ojeda .............. | F02M 26/02 |
| | | | 60/278 |
| 2015/0233315 A1* | 8/2015 | Kumar ................ | F02D 41/1441 |
| | | | 60/274 |
| 2016/0177793 A1* | 6/2016 | Keppy ................ | F02D 41/0275 |
| | | | 60/274 |
| 2016/0251012 A1* | 9/2016 | Schneider .......... | F02D 41/0235 |
| | | | 701/22 |
| 2017/0037799 A1* | 2/2017 | Balenovic ............. | F01N 3/2066 |
| 2017/0225119 A1* | 8/2017 | Mahecha-Botero ... | F23J 15/025 |

FOREIGN PATENT DOCUMENTS

| | | | | |
|---|---|---|---|---|
| DE | 103 18 214 A1 | 11/2004 | ............... | F01N 11/00 |
| DE | 103 21 873 A1 | 12/2004 | ............... | F02D 21/08 |
| DE | 10 2005 045 858 A1 | 4/2007 | ............... | F01N 9/00 |
| DE | 10 2008 050 299 A1 | 4/2009 | ............... | F01N 11/00 |
| FR | 2 933 737 A1 | 1/2010 | ............... | F01N 11/00 |
| GB | 2 344 771 A | 6/2000 | ............... | B01D 53/94 |
| JP | 2006-266144 A | 10/2006 | ............... | B01D 53/94 |
| WO | 2017/207209 A1 | 12/2017 | ............... | F01N 11/00 |

OTHER PUBLICATIONS

German Office Action, Application No. 10 2016 209 358.4, 9 pages, dated Jan. 12, 2017.
International Search Report and Written Opinion, Application No. PCT/EP2017/060681, 20 pages, dated Jul. 17, 2017.

* cited by examiner

METHOD AND DEVICE FOR MONITORING A NITROGEN OXIDE TRAP

CROSS-REFERENCE TO RELATED APPLICATIONS

This application is a U.S. National Stage Application of International Application No. PCT/EP2017/060681 filed May 4, 2017, which designates the United States of America, and claims priority to DE Application No. 10 2016 209 358.4 filed May 31, 2016, the contents of which are hereby incorporated by reference in their entirety.

TECHNICAL FIELD

The present disclosure relates to nitrogen oxide traps. Various embodiments may include a method and/or a device for monitoring a nitrogen oxide trap.

BACKGROUND

Ever more stringent regulatory requirements relating to permissible pollutant emissions in motor vehicles in which internal combustion engines are arranged make it necessary to keep the pollutant emissions during the operation of the internal combustion engine as low as possible. On account thereof, it is necessary for the pollutant components in the exhaust tract to be determined in a very precise manner, in particular for the use of exhaust gas post-treatment systems such as catalytic converters. Such exhaust gas after-treatment systems comprise, for example, nitrogen oxide traps for filtering nitrogen oxides. Nitrogen oxide traps have to be regularly regenerated during operation so that they can filter nitrogen oxides again.

SUMMARY

The teachings of the present disclosure may be embodied in a method and/or a device which contribute to very reliable operation of the nitrogen oxide trap. For example, some embodiments may include a method for monitoring a nitrogen oxide trap, in which a storage capacity of the nitrogen oxide trap is monitored as a function of the monitoring, nitrogen oxide trap regeneration is deactivated up to the onset of a predetermined event, such that, if the nitrogen oxide trap regeneration would be activated in the case of normal operation, the nitrogen oxide trap regeneration is not activated.

In some embodiments, in order to monitor the storage capacity a storage capacity value is determined which is representative of a determined residual capacity of the nitrogen oxide trap, the storage capacity value is compared with a predefined threshold value, and when the threshold value is undershot the nitrogen oxide trap regeneration is deactivated.

In some embodiments, the threshold value is additionally compared with a storage capacity value before refueling with fuel, and the nitrogen oxide trap regeneration is deactivated only if the storage capacity value before the refueling is significantly higher than the threshold value.

In some embodiments, a reduction rate of the storage capacity is determined during the monitoring of the storage capacity, the sulfur content in the fuel is determined as a function of the reduction rate, the sulfur content is compared with a predefined sulfur threshold value, and when the sulfur threshold value is exceeded the nitrogen oxide trap regeneration is deactivated.

In some embodiments, the sulfur content in the fuel is determined by means of a predefined sulfur model as a function of an injected quantity of fuel over time.

In some embodiments, the sulfur threshold value is approximately 200 ppm.

In some embodiments, the predefined result comprises refueling again with a predefined minimum quantity of fuel.

In some embodiments, the minimum quantity of fuel is four times a residual quantity of fuel before the refueling.

In some embodiments, if the nitrogen oxide trap regeneration is deactivated, it is additionally signaled to the driver of the vehicle that refueling has been carried out with a sulfur-rich fuel.

In some embodiments, after the onset of the predefined event, nitrogen oxide trap regeneration is carried out, the sulfur content in the fuel is determined again, the re-determined sulfur content is compared with a second sulfur threshold value, and when the second sulfur threshold value is undershot, the nitrogen oxide trap regeneration is activated again, such that, if the nitrogen oxide trap regeneration would be activated in the case of normal operation, the nitrogen oxide trap regeneration is activated.

In some embodiments, when the second sulfur threshold value is undershot, the signaling to the driver of the vehicle is ended.

In some embodiments, the second sulfur threshold value is approximately 50 ppm.

As another example, some embodiments include a device for monitoring a nitrogen oxide trap, wherein the device is designed to carry out a method as described above.

As another example, some embodiments includes a computer program for monitoring a nitrogen oxide trap, wherein the computer program is designed to carry out a method as described above when it is executed on a data processing device.

As another example, some embodiments include a computer program product comprising executable program code, wherein, in the case of execution by a data processing device, said program code executes the method as described above.

BRIEF DESCRIPTION OF THE DRAWINGS

Exemplary embodiments of the invention will be explained in more detail hereinbelow by means of the schematic drawing.

DETAILED DESCRIPTION

Figure 1:
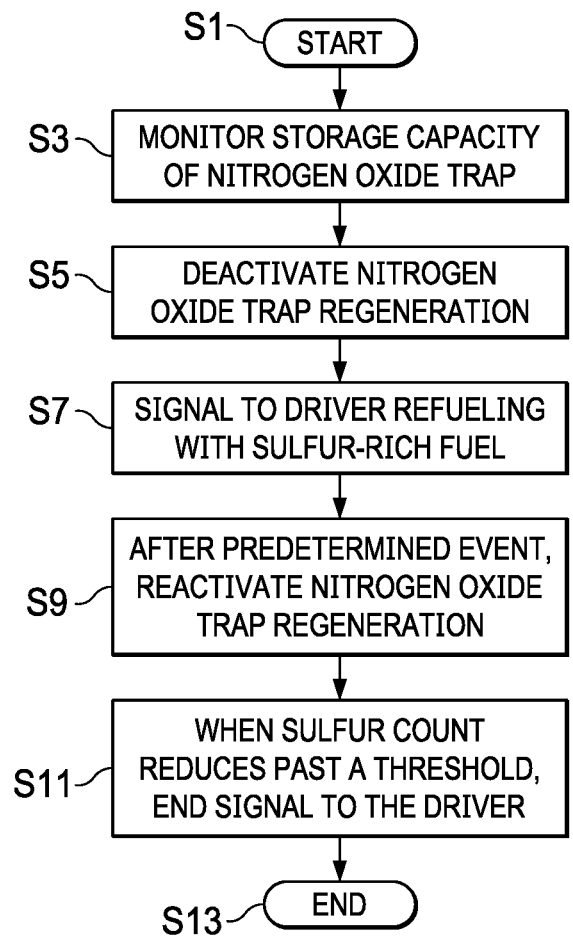
FIG. 1 shows a flow diagram relating to the monitoring of a nitrogen oxide trap.

Some embodiments of the teachings herein include a method for monitoring a nitrogen oxide trap and/or a device for monitoring the nitrogen oxide trap, wherein the device is designed to perform the method for monitoring the nitrogen oxide trap. In some embodiments, a storage capacity of the nitrogen oxide trap is monitored. As a function of the monitoring, nitrogen oxide trap regeneration is deactivated up to the onset of a predetermined event, such that, if the nitrogen oxide trap regeneration would be activated in the case of normal operation, the nitrogen oxide trap regeneration is not activated.

In the case of normal operation, the nitrogen oxide trap is, for example, regenerated whenever a residual capacity of the nitrogen oxide trap undershoots a predefined threshold.

However, if refueling is carried out with a sulfur-rich fuel, this can cause the nitrogen oxide trap to have to be regenerated very frequently. This has, in particular, two disadvantages. The emission of CO2 increases during the nitrogen oxide trap regeneration.

Furthermore, an excessive number of regenerations of the nitrogen oxide trap is damaging, so that it has to be replaced more frequently. Since the storage capacity of the nitrogen oxide trap is monitored, it is possible to detect whether refueling has been carried out with sulfur-rich fuel and the nitrogen oxide trap regeneration is deactivated. As a result, the emission of CO2 is reduced and the service life of the nitrogen oxide trap is increased. However, since the nitrogen oxide trap can no longer filter as many nitrogen oxides, some embodiments move the nitrogen oxide filtering to an SCR catalytic converter (selective catalytic reduction) and/or to increase the EGR-Rate (exhaust gas recirculation) and/or to heat up the SCR catalytic converter more quickly.

In some embodiments, to monitor the storage capacity a storage capacity value is determined which is representative of a determined residual capacity of the nitrogen oxide trap. The storage capacity value is compared with a predefined threshold value. When the threshold value is undershot, the nitrogen oxide trap regeneration is deactivated. For example, the storage capacity value can be determined after each nitrogen oxide trap regeneration and/or during a nitrogen oxide storage phase by means of a nitrogen oxide sensor, which is arranged downstream of the nitrogen oxide trap in the direction of flow of the exhaust gas, and a lambda sensor. If the storage capacity value undershoots the threshold value, there is too much sulfur in the fuel and the nitrogen oxide trap regeneration can be deactivated.

In some embodiments, the threshold value is additionally compared with a storage capacity value before refueling with fuel, and the nitrogen oxide trap regeneration is deactivated only if the storage capacity value before the refueling is significantly higher than the threshold value. In some embodiments, if refueling has been carried out with a large amount of new fuel, the method includes checking whether there is a large amount of sulfur in the fuel. In some embodiments, this includes comparing the threshold value with the storage capacity value before refueling. Significantly higher means in this context, for example, that the storage value capacity is at least two or three or four times the threshold value.

In some embodiments, a reduction rate of the storage capacity is determined during the monitoring of the storage capacity. The sulfur content in the fuel is determined as a function of the reduction rate. The sulfur content is compared with a predefined sulfur threshold value, and when the sulfur threshold value is exceeded the nitrogen oxide trap regeneration is deactivated. The reduction rate is suitable particularly for drawing a conclusion about the sulfur content in the fuel. In the case of a high reduction rate, that is to say in the case of a rapid reduction in the storage capacity, the sulfur content in the fuel is higher than in the case of a low reduction rate.

In some embodiments, the sulfur content in the fuel is determined by means of a predefined sulfur model as a function of an injected quantity of fuel over time. As result, the sulfur content in the fuel can be determined particularly precisely. In some embodiments, the sulfur threshold value is approximately 200 ppm.

In some embodiments, the method includes deactivating the nitrogen oxide trap regeneration particularly starting from a sulfur content of approximately 200 ppm, since otherwise regeneration would have to take place too frequently. In this context, approximately 200 ppm means, for example, 180 ppm to 220 ppm, and in particular 200 ppm.

In some embodiments, the predefined result comprises refueling again with a predefined minimum quantity of fuel.

In some embodiments, the method includes deactivating the nitrogen oxide trap regeneration until refueling is carried out again, since it is only then that the sulfur content in the fuel changes.

In some embodiments, the minimum quantity of fuel is four times a residual quantity of fuel before the refueling. In particular in the case of minimum refueling with four times the residual quantity of fuel, the sulfur content in the fuel can change significantly, so that it is advantageous to deactivate the nitrogen oxide trap regeneration until such refueling. The new fuel in the tank must therefore contain, in particular, at least 80% of new fuel and at maximum 20% of old fuel.

In some embodiments, if the nitrogen oxide trap regeneration is deactivated, it is additionally signaled to the driver of the vehicle that refueling has been carried out with a sulfur-rich fuel. As a result, it can easily be signaled to the driver of the vehicle that refueling has been carried out with a sulfur-rich fuel, so that the driver of the vehicle knows that he should no longer refuel with this fuel. The signaling is carried out, for example, by means of a warning lamp in the display or instrument panel of the vehicle.

In some embodiments, after the onset of the predefined event, nitrogen oxide trap regeneration is carried out. The sulfur content in the fuel is determined again. The re-determined sulfur content is compared with a second sulfur threshold value. When the second sulfur threshold value is undershot, the nitrogen oxide trap regeneration is activated again, such that, if the nitrogen oxide trap regeneration would be activated in the case of normal operation, the nitrogen oxide trap regeneration is activated. The re-determination of the sulfur content in the fuel is carried out, for example, as described above, by means of the reduction rate.

As result, nitrogen oxide trap regeneration is activated only if refueling was carried out with low-sulfur fuel, so that the emission of CO2 decreases further and the service life of the nitrogen oxide trap is increased.

In some embodiments, when the second sulfur threshold value is undershot, the signaling to the driver of the vehicle is ended. It can thus easily be signaled to the driver of the vehicle that the fuel with which refueling has been carried out again is low in sulfur. In some embodiments, the second sulfur threshold value is approximately 50 ppm.

In some embodiments, the method includes activating the nitrogen oxide trap regeneration again particularly starting from approximately 50 ppm. In this context, approximately 50 ppm means, for example, 40 ppm to 60 ppm, and in particular 50 ppm.

In some embodiments, a computer program carries out the method for monitoring a nitrogen oxide trap. In some embodiments, the computer program product comprises an executable program code, wherein, in the case of execution by a data processing device, said program code executes the method for monitoring a nitrogen oxide trap. The computer program product comprises, in particular, a medium which can be read by the data processing device and on which the program code is stored.

nitrogen oxide trap is arranged in an exhaust gas section of a vehicle. The vehicle has, in particular, a first nitrogen oxide sensor, a second nitrogen oxide sensor and the nitrogen oxide trap, wherein the first nitrogen oxide sensor is arranged upstream of the nitrogren oxide trap in the direction of flow of the exhaust gas, and the second nitrogen oxide sensor is arranged downstream of the nitrogen oxide trap in the direction of flow of the exhaust gas. The nitrogen oxide trap is, in particular, an LNT (Lean NOx trap).

The vehicle additionally has, for example, two lambda sensors, wherein a lambda sensor is arranged upstream of the nitrogen oxide trap in the direction of flow of the exhaust gas, and the other lambda sensor is arranged downstream of the nitrogen oxide trap in the direction of flow of the exhaust gas.

Figure 2:
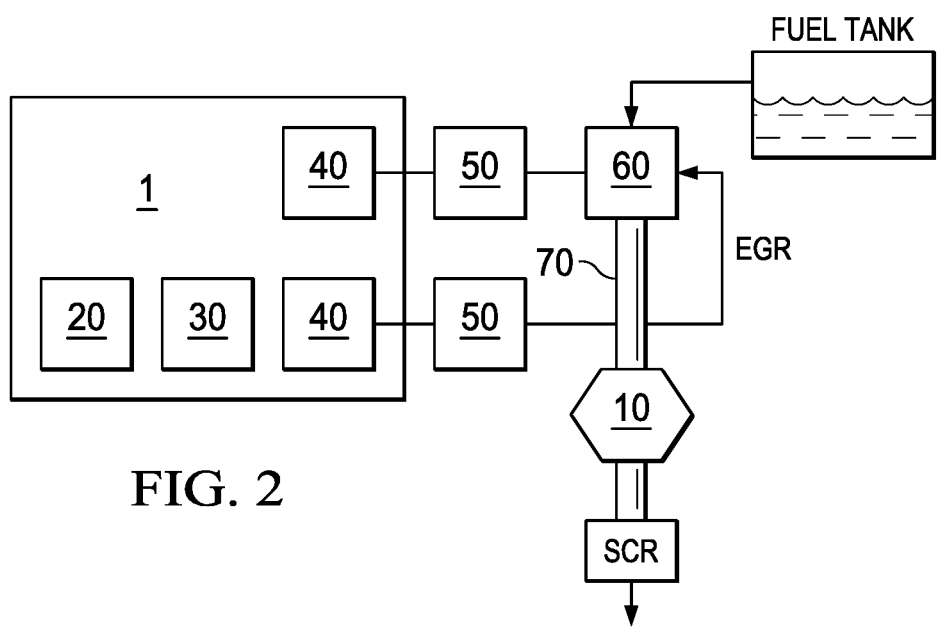
FIG. 2 is a schematic drawing showing various aspects of a motor vehicle including an internal combustion engine.

As shown in FIG. 2, a control device 1 is designed to monitor the storage capacity of the nitrogen oxide trap 10. For this purpose, the control device 1 has, in particular, a processing unit 20, a program and data memory 30 and, for example, one or more communication interfaces 40. The program and data memory 30 and/or the processing unit 20 and/or the communication interfaces 40 may be formed in a single module as shown and/or may be distributed between several modules. The control device 1 may also be referred to as a device for monitoring a nitrogen oxide trap and/or a controller. For this purpose, in particular, a program for monitoring the nitrogen oxide trap is stored in the data and program memory 30 of the control device 1. The control device 1 as shown is in communication with one or more sensors 50 arrayed in a combustion chamber 60, an exhaust tract 70, an EGR system, an SCR system, or the nitrogen oxide trap 10 of an internal combustion engine of a vehicle.

FIG. 1 shows a flow diagram of the program for monitoring the nitrogen oxide trap. The program is started in a step S1, in which variables can optionally be initialized.

In a step S3, a storage capacity of the nitrogen oxide trap is monitored.

In order to monitor the storage capacity a storage capacity value, for example, is determined which is representative of a determined residual capacity of the nitrogen oxide trap.

The storage capacity value can be determined, for example, after each nitrogen oxide trap regeneration and/or during a nitrogen oxide storage phase by means of the nitrogen oxide sensor, which is arranged downstream of the nitrogen oxide trap in the direction of flow of the exhaust gas, and the lambda sensor.

In some embodiments, a reduction rate of the storage capacity is determined during the monitoring. The sulfur content in the fuel is determined as a function of the reduction rate. The sulfur content is additionally determined, for example, by means of a predefined sulfur model as a function of an injected quantity of fuel over time.

In a step S5, as a function of the monitoring, nitrogen oxide trap regeneration is deactivated up to the onset of a predetermined event, such that, if the nitrogen oxide trap regeneration would be activated in the case of normal operation, the nitrogen oxide trap regeneration is not activated. The predetermined event is, for example, refueling again with a predefined minimum quantity of fuel, wherein the minimum quantity of fuel is, for example, four times a residual quantity of fuel before the refueling.

If, in order to monitor the storage capacity, the storage capacity value is determined, the storage capacity value can be compared, for example, with a predefined threshold value, and when the threshold value is undershot the nitrogen oxide trap regeneration can be deactivated. The threshold value can be optionally additionally compared with a storage capacity value before refueling with fuel, and the nitrogen oxide trap regeneration is deactivated only if the storage capacity value before the refueling is significantly higher than the threshold value.

If, while monitoring the storage capacity, the sulfur content in the fuel is determined, the sulfur content can be compared with a predefined sulfur threshold value, and when the sulfur threshold value is exceeded the nitrogen oxide trap regeneration can be deactivated. The sulfur threshold value is, for example, approximately 200 ppm.

In step S7, if the nitrogen oxide trap regeneration is deactivated, it is additionally signaled to the driver of the vehicle that refueling has been carried out with a sulfur-rich fuel.

In step S9, after the onset of the predetermined event, a nitrogen oxide trap regeneration is carried out. The sulfur content in the fuel is determined again. The re-determined sulfur content is compared with a second sulfur threshold value, wherein the second sulfur threshold value is, for example, approximately 50 ppm. When the second sulfur threshold value is undershot, the nitrogen oxide trap regeneration is activated again, such that, if the nitrogen oxide trap regeneration would be activated in the case of normal operation, the nitrogen oxide trap regeneration is activated.

The re-determination of the sulfur content is carried out, for example, as in step S3.

In step S11, when the second sulfur threshold value is undershot, the signaling to the driver of the vehicle is ended.

In a step S13, the program is ended, and may be started again in the step S1 as necessary.

By means of the teachings described herein, it is possible to monitor the storage capacity of the nitrogen oxide trap easily. It can therefore be detected whether refueling has been carried out with sulfur-rich fuel and the nitrogen oxide trap regeneration can be deactivated. As a result, the emission of CO2 is reduced and the service life of the nitrogen oxide trap is increased. However, since the nitrogen oxide trap can no longer filter as many nitrogen oxides, it is advantageous to move the nitrogen oxide filtering to an SCR catalytic converter (selective catalytic reduction) and/or to increase the EGR-Rate (exhaust gas recirculation) and/or to heat up the SCR catalytic converter more quickly.

What is claimed is:

1. A method for monitoring a nitrogen oxide trap in an exhaust tract of a motor vehicle with an internal combustion engine, the method comprising:
   immediately after performing a regeneration of the nitrogen oxide trap, determining a residual capacity of the nitrogen oxide trap;
   if the residual capacity is below a predefined threshold, deactivating nitrogen oxide trap regeneration going forward;
   implementing at least one remedial action selected from the group consisting of: filtering nitrogen oxide from the exhaust tract using an SCR catalytic converter and applying heat to the SCR catalytic converter; and
   reactivating nitrogen oxide trap regeneration upon detection of a refueling event.

2. The method as claimed in claim 1, the method further comprising comparing a second threshold value with a storage capacity value before adding fuel to a fuel tank of the motor vehicle; and
   only deactivating the nitrogen oxide trap regeneration if the storage capacity value is at least twice the second threshold value.

3. The method as claimed in claim 1, wherein:
   determining a reduction rate of the storage capacity;
   determining a sulfur content in a fuel as a function of the reduction rate;
   comparing the sulfur content with a predefined sulfur threshold value; and
   if the sulfur threshold value is exceeded, deactivating the nitrogen oxide trap regeneration.

4. The method as claimed in claim 3, wherein the sulfur content in the fuel is determined by means of a predefined sulfur model as a function of an injected quantity of fuel over time.

5. The method as claimed in claim 3, wherein the sulfur threshold value is 200 ppm.

6. The method as claimed in claim 1, wherein the refueling event includes refueling the motor vehicle with at least a predefined quantity of fuel.

7. The method as claimed in claim 6, wherein the predefined quantity of fuel is four times a residual quantity of fuel stored in a fuel tank of the motor vehicle.

8. The method as claimed in claim 3, further comprising signaling to a driver of the motor vehicle that refueling has been carried out with a sulfur-rich fuel in response to exceeding the sulfur threshold value.

9. The method as claimed in claim 3, further comprising:
after reactivating nitrogen oxide trap regeneration, determining the sulfur content in the fuel again;
comparing the re-determined sulfur content with a second sulfur threshold value; and
if the second sulfur threshold value is exceeded, deactivating nitrogen oxide trap regeneration again.

10. The method as claimed in claim 9, further comprising deactivating a signal to a driver of a vehicle associated with the nitrogen oxide trap in response to undershooting the second sulfur threshold value; and
continuing the signal in response to overshooting the second sulfur threshold value.

11. The method as claimed in claim 9, wherein the second sulfur threshold value is 50 ppm.

12. A motor vehicle comprising:
a combustion chamber;
an exhaust tract for gasses leaving the combustion chamber;
a nitrogen oxide trap disposed to remove nitrogen oxide from gasses flowing through the exhaust tract; and
a controller monitoring the nitrogen oxide trap, the controller programmed to:
immediately after performing a regeneration of the nitrogen oxide trap, determine a residual capacity of the nitrogen oxide trap;
if the residual capacity is below a predefined threshold, deactivate nitrogen oxide trap regeneration going forward;
implement at least one remedial action selected from the group consisting of: filtering nitrogen oxide from the exhaust tract using an SCR catalytic converter and applying heat to the SCR catalytic converter; and
reactivate nitrogen oxide trap regeneration upon detection of a refueling event.

* * * * *